No. 622,073. Patented Mar. 28, 1899.
A. E. QUINLAN.
TILTING CHAIR.
(Application filed July 19, 1897.)
(No Model.)
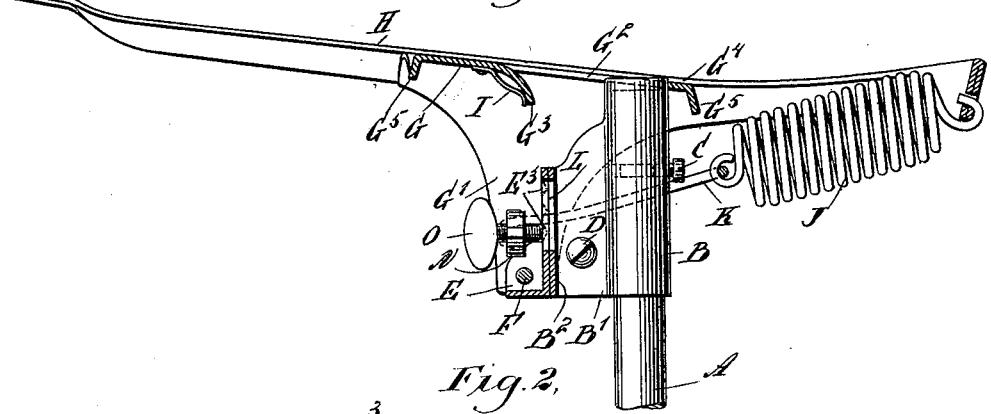
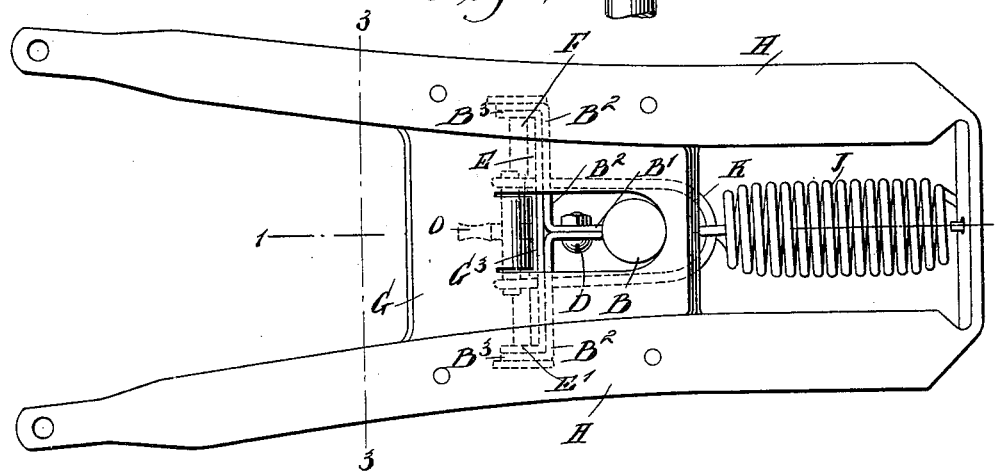
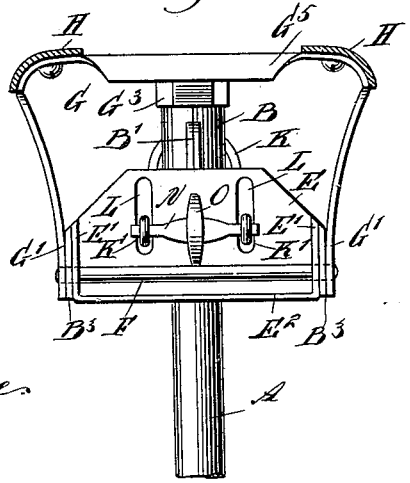
WITNESSES:
Edward Thorpe
Geo. G. Hoster
INVENTOR
A. E. Quinlan.
BY Munn & Co.
ATTORNEYS.

UNITED STATES PATENT OFFICE.

ALFRED EDGAR QUINLAN, OF SHEBOYGAN FALLS, WISCONSIN.

TILTING-CHAIR.

SPECIFICATION forming part of Letters Patent No. 622,073, dated March 28, 1899.

Application filed July 19, 1897. Serial No. 645,153. (No model.)

*To all whom it may concern:*

Be it known that I, ALFRED EDGAR QUINLAN, of Sheboygan Falls, in the county of Sheboygan and State of Wisconsin, have invented certain new and useful Improvements in Tilting-Chairs, of which the following is a full, clear, and exact description.

The object of the invention is to provide certain new and useful improvements in tilting-chairs whereby the bearing for the seat is well above the tilting-axis to reduce the friction on the bearing to a minimum, the device being also arranged to lessen the chance of accident from tilting the chair too far back and upsetting it, whereby any shock to the occupant of the chair is avoided.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement on the line 1 1 of Fig. 2. Fig. 2 is a plan view of the improvement, and Fig. 3 is a transverse section of the same on the line 3 3 of Fig. 2.

The tilting-chair is provided with the usual post A, the upper end of which is engaged by a bearing B, held against upward movement by a screw C, screwing in the bearing and extending into an annular recess formed in the upper end of a post A. (See dotted lines in Fig. 1.) The screw C may be substituted by a clip or tongue so formed as to be bent inwardly into the annular recess of the post A. The top of the bearing B is closed by a plug or other means, and the said bearing is preferably made of sheet metal bent into cylindrical shape for the bearing proper and also bent to form flanges B', extending longitudinally from the bearing and connected with each other by a screw D, as plainly indicated in the drawings. The screw D is for drawing up the flanges B' so as to contract the bearing, whereby a perfect fit on the post A can easily be maintained at all times. The flanges B' are formed with laterally-extending arms $B^2$, turned at their ends into lugs $B^3$ for receiving and carrying a pivot F, engaged by the depending arms G' of a yoke G, to which the seat-iron H is riveted or otherwise secured. The arms $B^2$, as well as the lugs $B^3$, are reinforced by a plate E, made of sheet metal and struck up in such a manner as to form flanges E'; abutting against the lugs $B^3$, and a bottom flange $E^2$ for strengthening the said plate and thereby reinforcing the arms $B^2$. The pivot F also passes through the flanges E', as shown. The yoke G, previously mentioned, is also made of sheet metal and bent into U form, with an opening $G^2$ in the top or middle portion and into which opening extends the upper end of the bearing B. A lug $G^3$ is formed on the middle portion of the yoke G and is bent downward from the opening $G^2$, so as to form a stop for the bearing B when the seat is tilted, the said bearing normally resting against the outer wall $G^4$ of the opening $G^2$, as plainly indicated in Fig. 1. The side edges of the middle portion of the yoke G are strengthened by transverse ribs $G^5$, struck up from the sheet metal of which the yoke is formed. The seat-iron H is likewise made of sheet metal and bent into U form, as is plainly indicated in Fig. 2, with the middle portion doubled and bent downwardly to form a transverse strengthening-rib, in which is secured one end of a spring J, connected at its other end with a clevis K, extending on opposite sides of the bearing B to pass with its side arms through elongated openings L in the arms $B^2$ and the plate E. The ends of the side arms of the clevis terminate in eyes K', engaged by the ends of a cross-piece N, in which screws a screw O, having its point resting in one of a series of indentations or recesses $E^3$ formed in the outer face of the said plate E. By screwing up the screw O more or less tension can be given to the spring J, and by shifting the said screw up or down a different angle can be given to the pull of the said spring relatively to the pivot F and bearing B.

Now it will be seen that by the arrangement described the entire device can be very simply and cheaply constructed and readily applied to a chair-seat by bolting or otherwise fastening the seat-iron H to the seat or its frame.

It will further be seen that by the arrangement described the bearing B is well above the pivot F, on which the rocking takes place, thus reducing the friction on the bearing-surface. Where the rotation is in a bearing at the base or legs of the chair, there is so much friction when the chair is tilted back that the bearings soon get loose and wear out. This is prevented by the arrangement described. Furthermore, the stop $G^3$, on account of being located normally directly above the pivot F, permits the operator to tilt back without danger of upsetting the chair, as is so frequently the case with tilting-chairs as heretofore constructed. As the lug $G^3$ is made of spring metal, it readily yields on the bearing B, striking the stop when the chair is suddenly tilted back, so that all shock and danger to the occupant of the chair is prevented. The spring-lug $G^3$ may be reinforced, if desired, by an additional spring I, as shown in Fig. 1.

By having the adjustable device for the clevis K connected with the spring J, I am enabled to give the desired tension to the said spring and also to change the angle of the latter to allow the operator to adjust the device, as desired.

Having thus fully described my invention, I claim as new and desire to secure by Letters Patent—

1. A tilting-chair provided with a post, a yoke and a vertically-disposed bearing mounted to turn on the post, the said bearing being formed with longitudinal flanges terminating in lateral arms, the said arms being arranged to support the pivot for the yoke at one side of the bearing proper and below the upper end thereof, substantially as shown and described.

2. A tilting-chair attachment, comprising a yoke formed with stops, a seat-iron carried by the yoke, and a bearing adapted to turn on the chair-post, and formed with longitudinal flanges terminating in lateral arms having lugs for supporting the pivot for the said yoke, substantially as shown and described.

3. A tilting-chair attachment, comprising a yoke formed with stops, a seat-iron carried by the yoke, a bearing adapted to turn on the chair-post, and formed with longitudinal flanges terminating in lateral arms having lugs for supporting the pivot for the said yoke, and a reinforcing-plate for the said side arms and lugs, substantially as shown and described.

4. A tilting-chair attachment, comprising a yoke formed with stops, a seat-iron carried by the yoke, a bearing adapted to turn on the chair-post, and formed with longitudinal flanges terminating in lateral arms having lugs for supporting the pivot for the said yoke, a spring connected with one end of the seat-iron, a clevis connected with the other end of the said spring, a cross-arm engaging the said clevis, and a screw screwing in the said cross-arm and engaging a part of the bearing, substantially as shown and described.

5. A tilting-chair attachment, comprising a bearing mounted to turn on the chair-post, and a yoke formed with an opening in the top or middle into which extends the upper end of the said bearing, the said yoke being further provided with transversely-extending flanges or strengthening-ribs and with stops for the said bearing, substantially as shown and described.

6. A tilting-chair attachment comprising a bearing mounted to turn on the chair-post, and a yoke formed with an opening in its top or middle portion into which extends the upper end of the said bearing the said yoke being formed with transversely-extending flanges or strengthening-ribs and with stops for the bearing, one of the said stops being formed on the middle portion of the yoke and extending downward from the opening, the said stop being yielding, substantially as shown and described.

7. A tilting-chair attachment, provided with a bearing made of sheet metal bent into cylindrical form for the bearing proper, and into flanges extending longitudinally from the bearing and connected with each other by a screw, the outer ends of the flanges terminating in transverse arms formed with lugs adapted to carry the pivot for the yoke, substantially as shown and described.

8. A tilting-chair attachment comprising a yoke formed with stops, a seat-iron carried by the yoke, a bearing mounted to turn on the chair-post and supporting the pivot for the yoke at one side of the bearing and below the upper end thereof, one of the stops on the yoke being located normally directly above the pivot of the yoke, substantially as described.

9. A tilting-chair attachment, comprising a yoke formed with stops, a seat-iron carried by the yoke, a bearing mounted to turn on the chair-post and supporting the pivot for the yoke at one side of the bearing and below the upper end thereof, a spring connected at one end with the seat-iron a clevis connected with the other end of the said spring, and an adjusting device for the clevis, substantially as described.

ALFRED EDGAR QUINLAN.

Witnesses:
 JNO. E. THOMAS,
 STEDMAN THOMAS.